May 20, 1930. J. A. GENDRON 1,759,482
ANGLE RECORDING ATTACHMENT FOR TRANSITS
Filed May 19, 1923
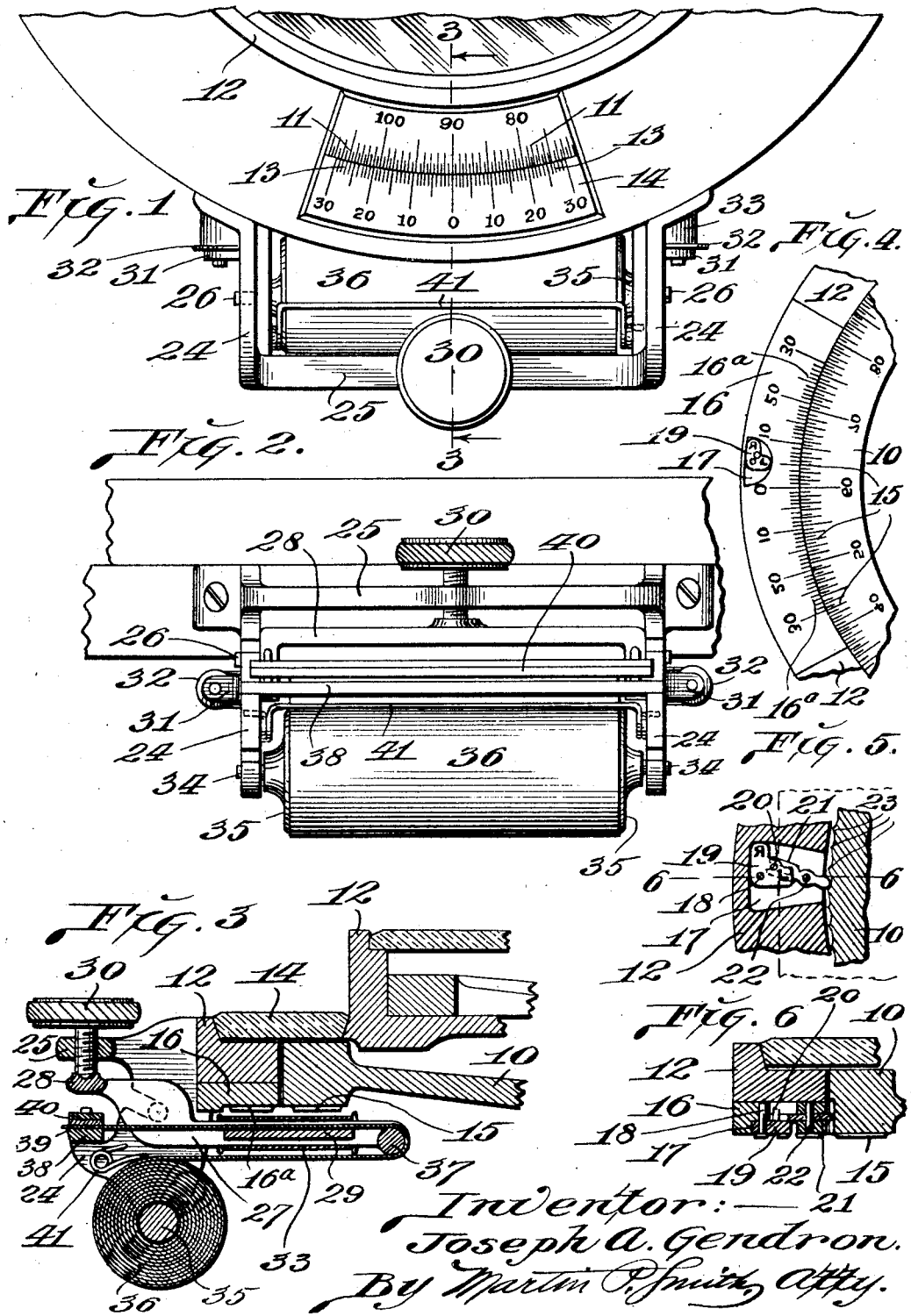

Patented May 20, 1930

1,759,482

UNITED STATES PATENT OFFICE

JOSEPH A. GENDRON, OF LOS ANGELES, CALIFORNIA

ANGLE-RECORDING ATTACHMENT FOR TRANSITS

Application filed May 19, 1923. Serial No. 640,221.

My invention relates generally to surveying instruments, such as transits, theodolites and the like, and more particularly to an attachment for making a permanent record of the measurements of angles that are ascertained by the use of said instruments.

It will be understood that transits and similar surveying instruments are provided with a graduated circle and a cooperating vernier that are arranged to give readings of horizontal or vertical angles in degrees, minutes and fractions of minutes, and the principal objects of my invention is to provide a relatively simple, practical and easily operated attachment by means of which, the measurements of angles as set forth by the graduated circle and the vernier may be mechanically impressed or printed upon a strip of paper or the like, thereby makng a permanent and accurate record of the measurement of the angles that are ascertained through the use of the surveying instruments.

Further objects of my invention are to provide an attachment of the character referred to that is relatively simple construction, capable of being easily and cheaply produced, applicable to practically all forms of transits and like surveying instruments; and further to provide an attachment that will insure accuracy in the recordation of the measurement of angles, and the operation of the recording attachment requiring very little time and effort on the part of the operator, in fact, less time than is ordinarily required to effect, with a glass or otherwise, an accurate reading of an angle measurement on the vernier and the graduated circle of the instrument.

With the foregoing and other objects in view, my invention consists in certain novel features of construction and arrangement of parts that will be hereinafter more fully described and claimed and illustrated in the accompanying drawings, in which:

Fig. 1 is a top plan view of a portion of a transit or similar surveying instrument, and showing my recording attachment in position thereupon.

Fig. 2 is a front elevational view of the attachment in position upon a surveying instrument.

Fig. 3 is a cross section taken approximately on the line 3—3 of Fig. 1.

Fig. 4 is a detail view of the horizontal limb and vernier plate of the instrument, looking against the underside thereof, and showing the reversed or inverted scales from which the record is made by my improved attachment.

Fig. 5 is a detail section showing that portion of the recording means that is effective in recording the direction of movement of the upper or vernier plate of the instrument.

Fig. 6 is a vertical section taken approximately on the line 6—6 of Fig. 5.

Referring by numerals to the accompanying drawings which illustrate a practical embodiment of my invention, 10 designates the relatively fixed horizontal limb of a surveying instrument, such as a transit, the same being provided in the usual manner on its upper face and adjacent to its marginal edge, with a graduated circle 11, and which latter may be marked and graduated in accordance with the azimuth system, the transit system, the compass system, or the stadia system.

Arranged for independent rotary movement in the usual manner above the horizontal limb, is the upper or vernier plate 12, which carries upon suitable standards, the usual telescope (not shown).

Arranged on the upper face of the outer portion of the upper plate 12, or that portion which encircles the horizontal limb 10 is a vernier 13, that is marked and graduated in the usual manner and overlying this vernier and the adjacent portion of the graduated circle that is formed on the horizontal limb, is a section 14, of plate glass or analogous transparent material.

My invention contemplates the formation of an inverted graduated circle that is formed on the horizontal limb, and the graduated marks or numbers on this inverted circle are positioned directly below the corresponding numbers of the circle 11 on the upper surface of the limb, and, further, the graduated marks and numbers on this inverted graduated circle are slightly raised after the manner of the printing faces of type. This arrangement of numbers on this inverted circle as well as upon the adjacent inverted vernier is clearly illustrated in Fig. 4.

Secured to the underside of the upper plate 12 and directly beneath the vernier 13 thereupon is a plate 16 on the underside of which is formed an inverted and recessed vernier 16ª, the marks and numbers on which are positioned directly beneath the corresponding marks and numbers on the upper vernier 13.

Formed on the underside of plate 16 is a recess 17, and seated in said plate within said recess is a pin 18 on which is pivotally mounted an angle plate 19, the arms of which are disposed at right angles to each other.

Formed on the undersides of the arms of this angle plate are, respectively, the raised and reversed letters R and L, the initial letters of the words "right" and "left". Seated in the angle plate 19 is an upwardly projecting pin 20 that passes through a slot that is formed in one end of a small escapement lever 21, and the latter being pivoted on a pin 22 that is seated in plate 16. The end of this lever 21 opposite to the end that engages pin 20 is adapted to be engaged by small corrugations 23 that are formed on the outer face or periphery of the horizontal limb 10.

Secured to the outer face of vernier plate 12 and directly opposite vernier 13 and its transparent cover plate 14, is a bracket comprising a pair of end plates 24, the outer ends thereof being connected by a cross bar 25.

Journaled in suitable bearings in the end plates 24 are pintles 26 that project outwardly from the side rail members 27 of a platen frame.

This frame includes a front cross bar 28 that connects the forward portions of side rail members 27 and arranged between the rear portions of the side rails is a plate or platen 29 that normally occupies a position immediately beneath the inverted and reversed vernier 16ª and the adjacent portion of the inverted and reversed graduated circle 15.

Screw-seated in the central portion of the bar 25 is a platen frame actuating screw 30, the lower end of which bears on top of the central portion of bar 28.

Arranged in suitable bearings 31, on the outer faces of the rear portions of the side rails 27 are rollers 32 that support an ink-carrying element, preferably a ribbon 33, the same passing lengthwise above and beneath the platen frame.

Journalled in suitable bearings in the lower portions of the end plates 24 are the trunnions 34 of a spool 35 that carries a roll of paper 36 and from the top of said roll the web of paper extends rearwardly beneath the lower portion of ribbon 33, thence around a roller 37 that is journalled between the rear portions of the side rails 27 and from said roller the web of paper extends forward over the platen 29 and below the upper portion of the inking ribbon.

Secured on the front portion of end plates 24 is a transversely disposed bar 38 having its front face bevelled to form a tearing edge 39 and the web of paper passes over the top of this bar and is retained in position thereon by an overlying pressure bar 40. The ends of a pressure spring 41 are seated in the end plates 24 and the intermediate portion of this spring bears on the roll of paper 36 to restrain the same against unwinding too freely.

Inasmuch as my improved attachment is secured to the upper or vernier plate, the two parts move together whenever said vernier plate that carries the telescope is rotated.

After an angle has been determined by the use of the transit in the usual manner, the upper or vernier plate 12 is locked by means of the usual clamp screw and immediately thereafter the operator manipulates screw 30 so as to move the same downwardly through bar 25 thereby swinging the platen frame so as to elevate same.

As this is done, platen 29 will press that portion of the web of the paper that overlies said platen and the overlying portion of the ribbon 33 against the raised figures and marks of the inverted vernier 16ª and the adjacent portion of the inverted graduated circle 15 and consequently making upon the paper an accurate, permanent record of the angle measurements ascertained through the use of the instrument to which the attachment is applied.

After this printing and recording operation has been effected, screw 30 is loosened to permit platen 29 to drop away from the printing surfaces of the inverted vernier and graduated circle, after which the section of paper upon which the impression was made is pulled forward and torn off by engagement against tearing edge 39 on bar 38.

When the upper or vernier plate 12 is rotated about horizontal limb 10, the engagement of corrugations 23 with the corresponding end of escapement lever 21, swings the latter on its pivot 22 and, as a result, angle plate 19 is moved a quarter of a turn. This movement brings the proper arm into position so that the raised letter thereon will be in position to print, on the section of paper with the printed record of the angle, the direction in which the vernier plate was rotated, just prior to the printing operation.

For instance, if the vernier plate is rotated to the right, then plate 19, if not already in position so that its arm bearing the reversed letter R is in printing position, will be rotated approximately a quarter of a turn, or so that the arm bearing the raised letter R is positioned so as to produce an impression of the latter on the edge of the paper.

Thus the operator is guided in his work and, at the same time, a permanent record of the movements of the telescope upon its vertical axis is made.

Thus it will be seen that I have provided a relatively simple, practical and efficient device that is particularly designed for use upon transits and like surveying instruments and by means of which, permanent, accurate records of the measurements of angles, that are found through the use of the instruments, may be easily and quickly made.

My improved device is particularly valuable and effective in that it wholly eliminates the possibility of errors that very frequently occur as a result of mistakes made by operators in reading the vernier and graduated circle.

My improved angle measurement recording device may, with slight structural changes be advantageously employed in connection with the range finders of ordnance, artillery, naval guns and the like.

Various changes in the size, form and construction of the various parts of my improved angle measurement recording device may be made and substituted for those herein described without departing from the spirit of the invention, the scope of which is set forth in the appended claims.

I claim as my invention:

1. The combination with an angle measuring instrument having a concentrically arranged scale and a vernier of a manually operable frame pivotally mounted on the instrument, and printing mechanism including a roll and platen carried by said pivotally mounted frame for taking impressions of portions of said scale and vernier.

2. In an angle measuring instrument, the combination with a relatively fixed member provided on its lower surface with a corresponding graduated circle and a concentric rotatably mounted member having a vernier on its lower surface, of bearings on said rotatably mounted member, a manually operable frame supported by said bearings, a portion of which frame underlies the underfaces of the fixed and rotatably mounted members and the graduated circle and vernier on said underfaces, a platen carried by said manually operable frame, and a record roll, a portion of which is carried by and overlies said platen.

In testimony whereof I have signed my name to this specification.

JOSEPH A. GENDRON.